United States Patent [19]
Fiák et al.

[11] Patent Number: 4,730,944
[45] Date of Patent: Mar. 15, 1988

[54] ROLLER CIRCULATING SHOE WITH CLAMPING DEVICE

[75] Inventors: László Fiák; Sándor Derzsényi; Sándor Darin, all of Debrecen; László Molnár, Miskolc; János Vinkler, Debrecen, all of Hungary

[73] Assignee: Magyar Gördulöcsapagy Müvek, Debrecen, Hungary

[21] Appl. No.: 16,765

[22] Filed: Feb. 19, 1987

[30] Foreign Application Priority Data

Feb. 20, 1986 [HU] Hungary .................................. 714/86

[51] Int. Cl.⁴ ........................ F16C 29/06; F16C 23/06
[52] U.S. Cl. ........................................ 384/43; 384/40; 384/45
[58] Field of Search .................. 384/39, 40, 43–45, 384/7, 10, 26, 57, 247, 267

[56] References Cited
U.S. PATENT DOCUMENTS

| | | | |
|---|---|---|---|
| 3,389,625 | 6/1968 | Wagner | 384/44 X |
| 3,455,610 | 7/1969 | Meinke | 384/44 |
| 3,608,985 | 9/1971 | Swanson | 384/44 |
| 4,231,621 | 11/1980 | Teramachi | 384/45 |
| 4,550,955 | 11/1985 | Grabher et al. | 384/45 |
| 4,573,747 | 3/1986 | Frazee | 384/40 |

FOREIGN PATENT DOCUMENTS

| | | | |
|---|---|---|---|
| 1331907 | 9/1973 | United Kingdom | 384/581 |
| 2114251 | 8/1983 | United Kingdom | 384/43 |

*Primary Examiner*—Stuart S. Levy
*Assistant Examiner*—Thomas R. Hannon
*Attorney, Agent, or Firm*—Schweitzer & Cornman

[57] ABSTRACT

The invention relates to a roller circulating shoe with clamping device, on the sloping rear side of which a one-sided checking wedge, which can be shifted by means of an adjusting screw, is disposed with its sloping side, with a guiding insert lying between the clamping device and the checking wedge.

Pursuant to the invention, the essence lies therein that the guiding insert (5) has a projection (7), which is formed on at least one side of the guiding insert (5) and fits into the transverse groove (6), which is formed on the sloping rear side (2) of the roller circulating shoe (1), furthermore on one end of the guiding insert (5) a projection (8) is formed, which is suitable for adjustments in two direction, rotatably holds the adjusting screw (3) and is provided with a groove and in the end of the checking wedge (4) near the projection (8) of the guiding insert (5) that is provided with a groove, the threaded borehole (9) holding the adjusting screw (3) is formed.

1 Claim, 2 Drawing Figures

ROLLER CIRCULATING SHOE WITH CLAMPING DEVICE

The invention relates to a roller circulating shoe with clamping device, on the sloping rear side of which a one-sided checking wedge, which can be shifted by means of an adjusting screw, is disposed with its sloping side, with a guiding insert lying between the clamping device and the checking wedge.

A roller circulating shoe with a clamping device is known from the Hungarian Patent Application No. 308/82, the essence of which lies therein that, on the sloping rear side of the roller circulating shoe, a one-sided checking wedge, which can be shifted by means of an adjusting screw, is disposed with its sloping side, that furthermore on the end of the roller circulating shoe, which lies close to the rolling load-bearing surface and is constructed with a rear side, a projection is formed with a threaded borehole for an adjusting screw, which is supported on the higher end of the checking wedge, and that furthermore the roller circulating shoe and the clamping device are guided one on top of the other by means of a groove.

The deficiency of this solution lies therein that a special end element with a projection must be formed on the roller circulating shoe that is produced on a large scale, as a result of which there is an increase in size, costs and weight.

It is an object of this invention to eliminate the above deficiency, that is, to provide an inexpensive, accurate, light roller circulating shoe, which is equipped with a small device and by means of which the use of a roller circulating shoe, produced on a large scale, can easily be made possible.

Pursuant to the invention, the above objective is accomplished for a roller circulating shoe of the type named at the beginning owing to the fact that the guiding insert has a projection, which is formed on at least one side of the guiding insert and fits into the transverse groove, which is formed on the sloping rear side of the roller circulating shoe, that furthermore on one end of the guiding insert a projection is formed, which is suitable for adjustments in two direction, rotatably holds the adjusting screw and is provided with a groove and that in the end of the checking wedge near the projection of the guiding insert that is provided with a groove, the threaded borehole holding the adjusting screw is formed.

The invention will be described in greater detail by means of the example of the operation shown in the drawing.

Figure 1:
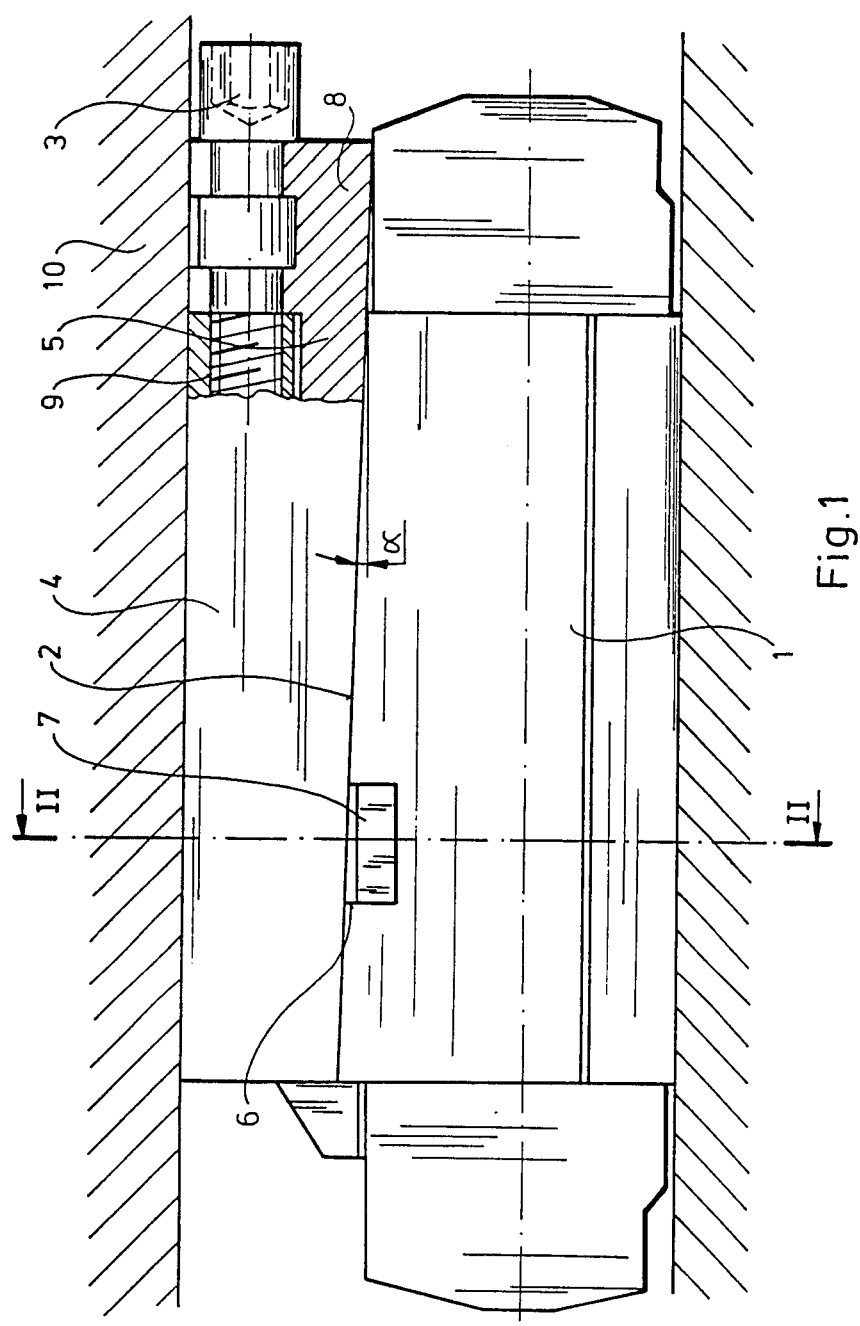
FIG. 1 shows the roller circulating shoe with the installed clamping device of the invention in side view.
Figure 2:
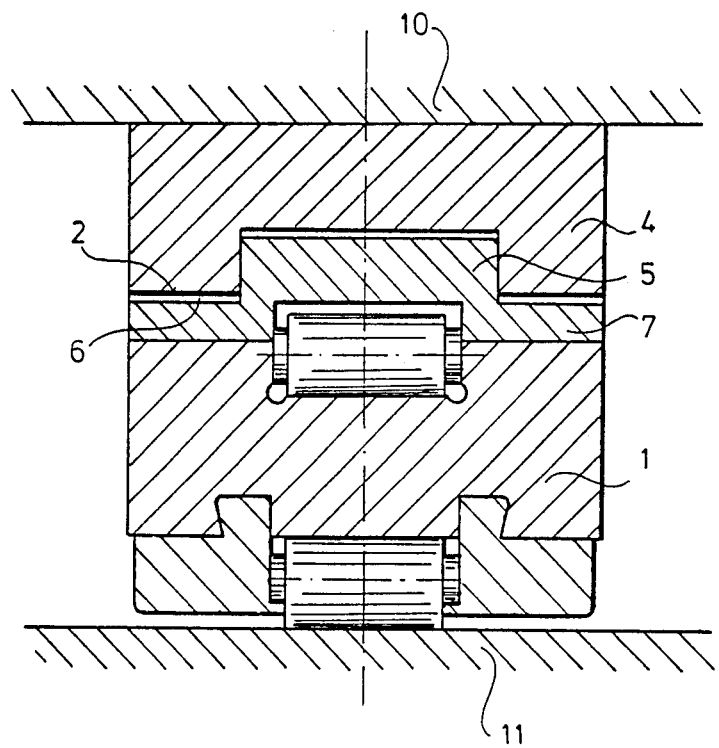
FIG. 2 shows the section along II—II of FIG. 1.

The rear side 2 of the roller circulating shoe 1 with the inventive clamping device is constructed so as to be sloping. A one-sided checking wedge 4 is disposed with its sloping side on the sloping rear side 2. A guiding insert 5 lies between the sloping rear side 2 and the checking wedge 4.

A projection 7 is advisable formed on each side of the guiding insert 5 and fits into the transverse groove 6, which is formed in the sloping rear side 2 of the roller circulating shoe 1.

A projection 8, which is provided with a groove and rotatably holds an adjustment screw 3 that is suitable for adjusting in two directions, is formed at the end of the guiding insert 5.

At the end of the checking wedge 4 near the projection of the guiding insert 5 that is provided with a groove, there is a threaded borehole 9 for accommodating the adjusting screw 3.

The function of the roller circulating shoe 1 with the inventive clamping device is now explained briefly in the following.

The roller circulating shoe 1 with the inventive clamping device is installed between the the supporting surface 10 (for exmaple, the carriage) of the machine tool and the transit path 11 (the bed).

By twisting the adjusting screw 3, the checking wedge 4 on the rear side 2 of the roller circulating shoe 1 is shifted, thus creating the desired tension between the supporting surface 10 and the transit path 11, that is, the initial tension necessary for the proper functioning of the roller circulating shoe 1 is produced in this manner.

We claim:
1. An adjustable anti-friction device, comprising:
   (a) a roller circulating shoe arranged to provide roller contact on one side with a support surface,
   (b) said shoe being provided on its other side with a surface inclined relative to said support surface,
   (c) an adjusting wedge movably mounted on the inclined surface of said shoe and arranged for engagement with a supported surface,
   (d) a guide insert disposed between said shoe and said adjusting wedge and having a grooved projection at one end,
   (e) an adjusting screw received and positioned in said grooved projection,
   (f) said guide insert having a locating projection formed on at least one side and engageable with said shoe, and
   (g) said wedge being threadably engagable with said adjusting screw, whereby said wedge may be adjustably moved relative to said shoe for adjusting the height of said device.

* * * * *